US006902276B2

(12) United States Patent
Glenn

(10) Patent No.: US 6,902,276 B2
(45) Date of Patent: Jun. 7, 2005

(54) COLOR PROJECTOR APPARATUS AND METHOD

(75) Inventor: William E. Glenn, Ft. Lauderdale, FL (US)

(73) Assignee: Florida Atlantic University, Boca Raton, FL (US)

( * ) Notice: Subject to any disclaimer, the term of this patent is extended or adjusted under 35 U.S.C. 154(b) by 84 days.

(21) Appl. No.: 10/620,291

(22) Filed: Jul. 14, 2003

(65) Prior Publication Data

US 2004/0130683 A1 Jul. 8, 2004

Related U.S. Application Data

(60) Provisional application No. 60/395,380, filed on Jul. 12, 2002.

(51) Int. Cl.[7] ............................................... G03B 21/28
(52) U.S. Cl. ......................................... 353/98; 353/31
(58) Field of Search ............................. 353/31, 34, 37, 353/97, 98, 99, 122

(56) References Cited

U.S. PATENT DOCUMENTS

| | | | | | |
|---|---|---|---|---|---|
| 3,882,271 | A | * | 5/1975 | Glenn | 348/771 |
| 4,111,538 | A | * | 9/1978 | Sheridon | 353/122 |
| 4,615,595 | A | * | 10/1986 | Hornbeck | 353/122 |
| 5,231,432 | A | * | 7/1993 | Glenn | 353/31 |
| 6,086,208 | A | * | 7/2000 | Glenn | 353/31 |

* cited by examiner

*Primary Examiner*—William C. Dowling
(74) *Attorney, Agent, or Firm*—Martin Novack

(57) ABSTRACT

An apparatus for displaying images represented by electronic image information, that includes a light source and a reflective light modulator for optically modulating, with the image information, light from the light source to obtain a diffraction pattern that depends on the image information. An optical system is provided for converting the diffraction pattern into an image, and projection optics are provided for projecting the image obtained with the optical system. The optical system includes an array of schlieren bars and a focusing reflector.

19 Claims, 2 Drawing Sheets

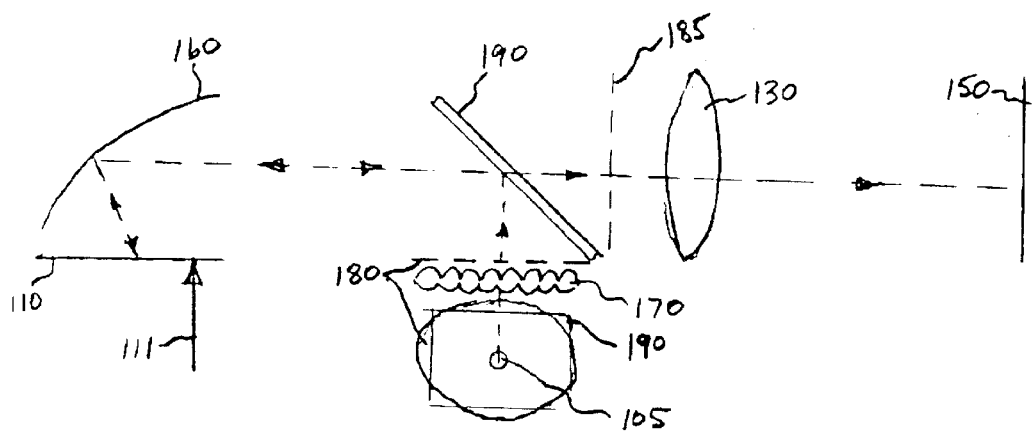
Figure 2
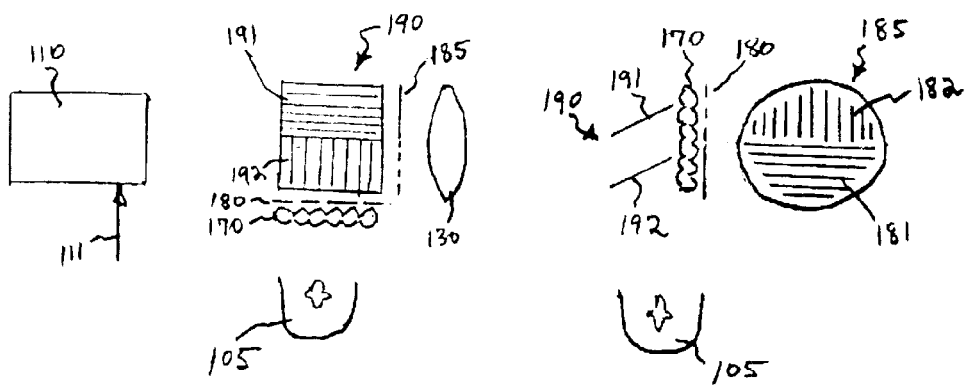
Figure 3
Figure 4

COLOR PROJECTOR APPARATUS AND METHOD

RELATED APPLICATION

The present Application claims priority from U.S. Provisional Patent Application No. 60/395,380 filed Jul. 12, 2002, and said Provisional Patent Application is incorporated herein by reference.

FIELD OF THE INVENTION

This invention relates to projection of images and, more particularly, to an improved apparatus and method for projecting and displaying images, still or moving, using a solid state light modulator. A form of the invention relates to a single modulator color projector that employs color selection by diffraction.

BACKGROUND OF THE INVENTION

A light valve projector projects a bright light source through an electro-optical system that receives electronic image information and produces a projected optical image. Light-valve projectors are rapidly converting to matrix driven arrays; examples being active matrix LCD projectors such as the projector disclosed in U.S. Pat. Nos. 5,231,432 and 6,086,208, and the so-called "DLP" display of Texas Instruments Company which uses technology originating from the type of solid state light modulator disclosed in U.S. Pat. No. 3,882,271.

One prior approach describes a solid state light modulator which employs a reflective patterned alignment modulator in a projector having a schlieren optical system. There is a drawback to this system, however. In order to get a high contrast ratio, the schlieren lens needs to have an extremely good non-reflective coating. For transmissive schlieren optics this is not a serious problem, since it takes two reflections from lens surfaces to reduce contrast. With a reflective system, however, only one reflection reduces contrast.

It is among the objects of the present invention to overcome disadvantages of prior art approaches, and to devise an improved method and apparatus for projection of images using solid state light modulation. It is among the further objects of the present invention to provide an improved single modulator color projector that employs color selection by diffraction.

SUMMARY OF THE INVENTION

In accordance with one aspect of the present invention, instead of employing the usual schlieren lens in a projector having a reflective modulator, a focusing reflector, such as a parabolic reflector, is used. In this manner, improvement in contrast can be achieved.

In one form of the invention, there is set forth an apparatus for displaying images represented by electronic image information, that includes a light source and a reflective light modulator for optically modulating, with the image information, light from the light source to obtain a diffraction pattern that depends on the image information. An optical system is provided for converting the diffraction pattern into an image, and projection optics are provided for projecting the image obtained with the optical system. The optical system includes an array of schlieren bars and a focusing reflector. In an embodiment of this form of the invention, the schlieren bars and focusing reflector are arranged such that the path of light from the light source comprises reflection from the schlieren bars to the focusing reflector and the reflective light modulator, and then again to the focusing reflector and then through the schlieren bars to the projection optics.

In another form of the invention, color imaging is achieved in an apparatus having an optical system that employs an array of shlieren bars which includes two portions having bars oriented in respectively different directions. In an embodiment of this form of the invention, complementary dichroic mirror sections (such as green and magenta) are used in conjunction with the indicated array of shlieren bars to achieve improved projection and display of color image information.

Further features and advantages of the invention will become more readily apparent from the following detailed description when taken in conjunction with the accompanying drawings.

BRIEF DESCRIPTION OF THE DRAWINGS

FIGS. 2, 3, and 4 show schematic diagrams of a single modulator color projector employing color projection by diffraction, in accordance with an embodiment of the invention. FIG. 2 is a top view, FIG. 3 is side view, and FIG. 4 is a front view of portions of this embodiment.

DETAILED DESCRIPTION

Figure 1:
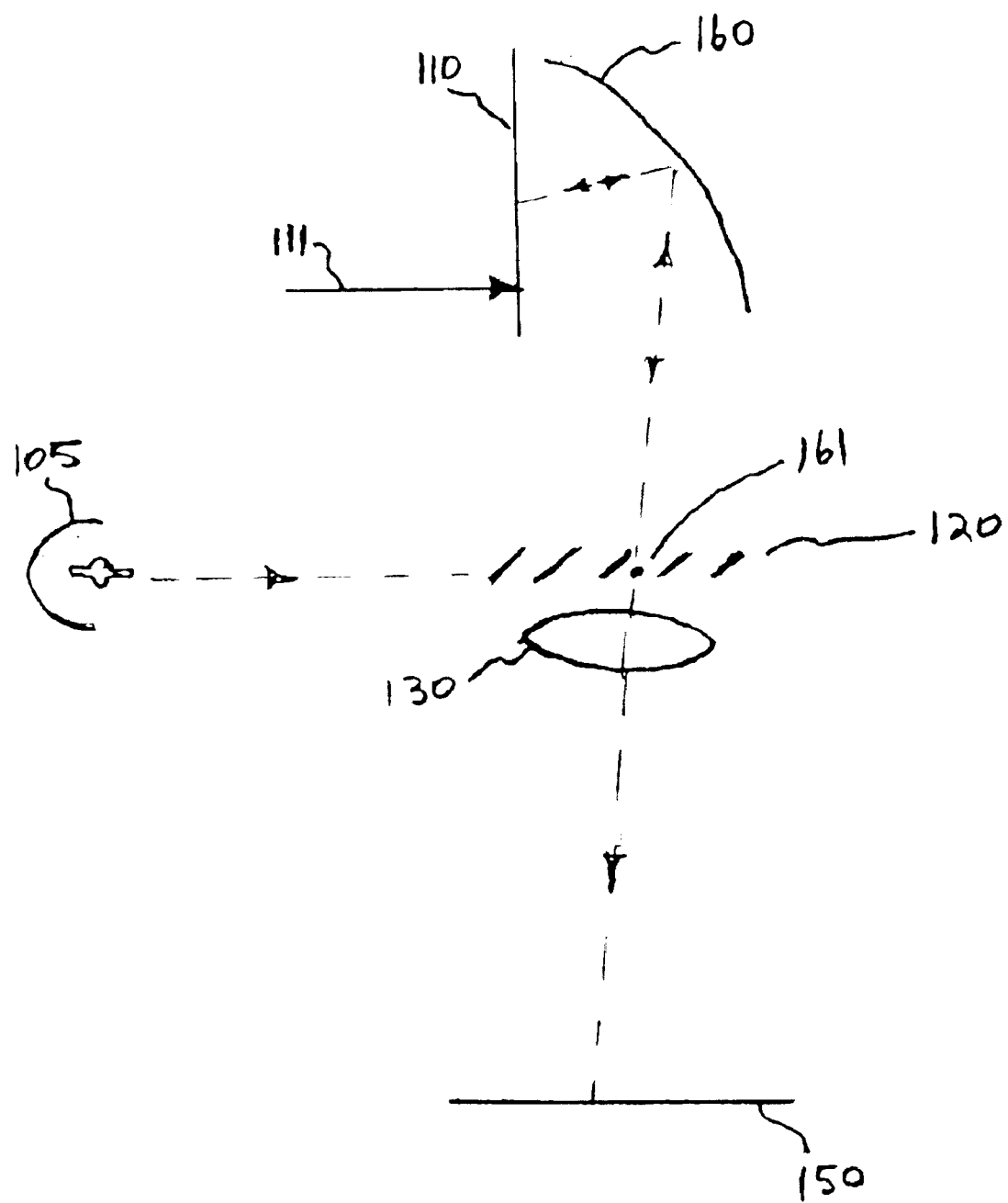
FIG. 1 is a schematic diagram of a solid state modulator image projector in accordance with an embodiment of the invention.

Examples of the general types of systems that employ solid state light modulators and other components that can be parts of the apparatus and methods hereof, are disclosed in my U.S. Pat. Nos. 3,882,271, 5,231,432, and 6,086,208 all incorporated by reference. In the '271 Patent, a charge pattern imposed on a semiconductor device deforms a reflective surface applied over the semiconductor device, which results in diffraction of light incident thereon, and a schlieren optical system converts the diffraction pattern into an image. In the '432 and '208 Patents, light formed into parallel optical beams by a diachronic reflector is directed through an input light mask component of a schlieren optical system comprising an array of bars between which there are transparent areas or slits, whereby the light transmitted by each transparent area appears to originate from a different source of light. In order to maximize the transmission of light through the light mask, the parallel optical beams from the source are focused onto the slits by a lenticular lens plate registered with the array of bars. The transmitted optical beams are split by a green-magenta dichroic mirror which splits the beams into a magenta beam (red and blue) and a green beam. The magenta beam is passed through a schlieren lens to illuminate a liquid crystal (LC) panel, referred to as a "magenta" panel. The green beam is passed through a second schlieren lens to illuminate a second LC panel, referred to as a "green" panel. As each of the beams passes through its respective LC panel, the red, blue and green components of the light from the source are selected by diffraction and their intensities modulated in accordance with processed video signals applied to the panels by associated electronic circuitry. The modulated beams are recombined by another green-magenta dichroic mirror, and the combined beam is directed through an output light mask comprising an array of schlieren bars, and projected onto a screen by a projection lens. The LC panels each function as a light modulating medium, the light modulating characteristics of which are controlled in accordance with color intelligence signals by applying the signals to the panels which include, in addition to the matrix electrodes, a structure of interdigital electrodes which form a color-selecting diffraction grating.

FIG. 1 illustrates, in simplified form, a form of the invention which employs a reflective light modulator represented at 110, which receives input electronic image-representative signals on a line 111 and generates a diffraction-producing reflective surface as previously described. Also seen in FIG. 1 are an arc lamp light source 105, an array of reflective schlieren bars 120, a projection lens 130, and a screen 150. The focusing in the schlieren optical system, in accordance with an improvement of the invention, is implemented by a parabolic reflector 160, the focal point of which is shown at 161, at the plane of the schlieren bars. In operation, light from the light source is reflected from the schlieren bars to the parabolic reflector and to the reflective light modulator 110, and then back the same path to and through the schlieren bars, for projection of the image on screen 150.

A further form of the invention, shown in FIGS. 2, 3, and 4, employs an electrode modulation system. This is a modification of an approach previously summarized, which uses color selected by diffraction. The electrodes can be the ones used to produce diffraction patterns in the commercial "Talaria" projector of General Electric Company, and can be practiced with either transmission or reflection. Reflection is preferred using the described optics, since it avoids the loss of contrast produced by the diffraction from the drive lines in a transmissive system.

In the diagrams of FIGS. 2–4, some elements of FIG. 1 have like reference numerals; namely arc lamp 105, reflective modulator 110, input signal line 111, parabolic reflector 160, projection optics 130, and screen 150. Also shown are lenticular integrator 170 and transmissive schlieren bar array 180, which is seen to include one portion (181) having schlieren bars for the green information, and, oriented orthogonally therefrom, another portion (182) for the magenta information. Dichoric mirror 190 includes green-reflecting dichroic portion 191 and magenta-reflecting dichroic portion 192. The output schlieren bar array is labeled 185.

A pixel can be subdivided into an array of 3 sub-pixels or an array of 3 by 3 sub-pixels. In the horizontal direction, in a sequence of two pixels sub-pixels are driven in clusters to produce a horizontal pair of gratings. Driving the sub-pixels in pairs produces the red diffraction grating and in triplets produces the green diffraction grating. Green is a diffracted vertically. In a vertical sequence of two pixels either one line on and one off will produce the green grating for the three by one matrix. Driving vertical sub-pixels in pairs will produce the green grating for the 3 by 3 matrix. The 3 by 3 arrangement will produce slightly better vertical resolution than the one by three. This is because the diffraction from the schlieren bars is less. The "Talaria" projector produced images similar to the one by three version.

The total amount of silicon needed for a solid state projector that uses one, two, or three modulators to produce color is the same for a given amount of light output. The modulator for a one chip version must be three times the area of each modulator in a three chip version. However, it does not have any registration problems. The one chip version has another subtle advantage. An integrator (as used in the "Talaria" projector) can be used to improve the optical efficiency and uniformity. The optical arrangement in the embodiment of FIGS. 2–4 illustrates use of an integrator in the present system.

What is claimed is:

1. Apparatus for displaying images represented by electronic image information, comprising:

a light source;

a reflective light modulator for optically modulating, with said image information, light from said light source to obtain a diffraction pattern that depends on said image information;

an optical system for converting said diffraction pattern into an image; and projection optics for projecting the image obtained with said optical system;

said optical system including an array of schlieren bars and a focusing reflector.

2. Apparatus as defined by claim 1, wherein said focusing reflector is a parabolic reflector.

3. Apparatus as defined by claim 1, wherein said schlieren bars and focusing reflector are arranged such that the path of light from said light source comprises reflection from said schlieren bars to said focusing reflector and reflective light modulator and then again to said focusing reflector and then through said schlieren bars to said projection optics.

4. Apparatus as defined by claim 2, wherein said schlieren bars and focusing reflector are arranged such that the path of light from said light source comprises reflection from said schlieren bars to said focusing reflector and reflective light modulator and then again to said focusing reflector and then through said schlieren bars to said projection optics.

5. Apparatus as defined by claim 1, wherein said optical system includes a further array of schlieren bars.

6. Apparatus as defined by claim 2, wherein said optical system includes a further array of schlieren bars.

7. Apparatus as defined by claim 6, wherein said array of schlieren bars and said further array of schlieren bars are both transmissive.

8. Apparatus as defined by claim 5, wherein at least one of said arrays of schlieren bars includes two portions having bars oriented in respectively different directions.

9. Apparatus as defined by claim 8, wherein said respectively different directions are orthogonal directions.

10. Apparatus as defined by claim 8, further comprising complementary color dichroic mirror sections provided in conjunction with said respective portions of said at least one array of schlieren bars.

11. Apparatus as defined by claim 9, further comprising complementary color dichroic mirror sections provided in conjunction with said respective portions of said at least one array of schlieren bars.

12. Apparatus for displaying color images represented by electronic image information, comprising:

a light source;

a plurality of light modulators for optically modulating, with said image information, light from said light source to obtain diffraction patterns that depend on color components said image information;

an optical system for converting said diffraction patterns into a color image; and projection optics for projecting the image obtained with said optical system;

said optical system including an array of schlieren bars that includes two portions having bars oriented in respectively different directions.

13. Apparatus as defined by claim 10, wherein said respectively different directions are orthogonal directions.

14. Apparatus as defined by claim 12, further comprising complementary color dichroic mirror sections provided in conjunction with said respective portions of said at least one array of schlieren bars.

15. Apparatus as defined by claim 13, further comprising complementary color dichroic mirror sections provided in conjunction with said respective portions of said at least one array of schlieren bars.

16. A method for displaying images represented by electronic image information, comprising the steps of:

providing a light source;

providing a reflective light modulator for optically modulating, with said image information, light from said light source to obtain a diffraction pattern that depends on said image information;

providing an optical system for converting said diffraction pattern into an image; and projecting the image obtained with said optical system;

said step of providing an optical system including providing an array of schlieren bars and a focusing reflector.

17. The method as defined by claim 16, wherein said step of providing a focusing reflector comprises providing a parabolic reflector.

18. The method as defined by claim 16, further comprising arranging said schlieren bars and focusing reflector such that the path of light from said light source comprises reflection from said schlieren bars to said focusing reflector and reflective light modulator and then again to said focusing reflector and then through said schlieren bars to projection.

19. The method as defined by claim 17, further comprising arranging said schlieren bars and focusing reflector such that the path of light from said light source comprises reflection from said schlieren bars to said focusing reflector and reflective light modulator and then again to said focusing reflector and then through said schlieren bars to projection.

* * * * *